(12) United States Patent
Heimberger

(10) Patent No.: US 10,353,065 B2
(45) Date of Patent: Jul. 16, 2019

(54) METHOD FOR DETECTING A MARK MADE ON A GROUND, DRIVER ASSISTANCE DEVICE AND MOTOR VEHICLE

(71) Applicant: VALEO Schalter und Sensoren GmbH, Bietigheim-Bissingen (DE)

(72) Inventor: Markus Heimberger, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 404 days.

(21) Appl. No.: 15/104,688

(22) PCT Filed: Nov. 21, 2014

(86) PCT No.: PCT/EP2014/075237
§ 371 (c)(1),
(2) Date: Jun. 15, 2016

(87) PCT Pub. No.: WO2015/090843
PCT Pub. Date: Jun. 25, 2015

(65) Prior Publication Data
US 2016/0320477 A1    Nov. 3, 2016

(30) Foreign Application Priority Data
Dec. 17, 2013  (DE) .................... 10 2013 021 326

(51) Int. Cl.
*G06K 9/00*    (2006.01)
*G01S 13/86*   (2006.01)
(Continued)

(52) U.S. Cl.
CPC ........... *G01S 13/867* (2013.01); *B60W 30/06* (2013.01); *G01S 13/931* (2013.01); *G01S 15/025* (2013.01);
(Continued)

(58) Field of Classification Search
CPC ..... B60R 1/00; B60R 2300/806; B60R 11/04; B60R 2300/308; B60R 2300/101;
(Continued)

(56) References Cited

U.S. PATENT DOCUMENTS

2003/0160866 A1* 8/2003 Hori ................. G01S 11/12
                                                 348/116
2004/0204812 A1* 10/2004 Tran ................. B60T 8/172
                                                 701/80
(Continued)

FOREIGN PATENT DOCUMENTS

DE    10 2005 015088 A1    11/2005
DE    10 2007 047362 A1     4/2009
(Continued)

OTHER PUBLICATIONS

International Search Report issued in PCT/EP2014/075237 dated Feb. 25, 2015 (3 pages).
(Continued)

*Primary Examiner* — Olumide Ajibade Akonai
(74) *Attorney, Agent, or Firm* — Osha Liang LLP

(57) ABSTRACT

The invention relates to a method for using a driver assistance device of a motor vehicle (1) to detect a mark (7) made on a ground (6) by providing a two-dimensional image by means of an imaging sensor (3) of the driver assistance device (2); by identifying a potential mark (7") on the basis of the two-dimensional image (11); and by performing a distance measurement by means of a distance sensor (4) of the driver assistance device and also taking a result (17) of the distance measurement as a basis for determining whether the potential mark (7") is the mark (7) made on the ground (6) or a mark (14) on an object (13) that is on the ground (6).

10 Claims, 3 Drawing Sheets

(51) Int. Cl.

| | | |
|---|---|---|
| *G01S 13/93* | (2006.01) | |
| *G01S 15/93* | (2006.01) | |
| *G01S 17/02* | (2006.01) | |
| *B60W 30/06* | (2006.01) | |
| *G01S 15/02* | (2006.01) | |
| *G01S 17/93* | (2006.01) | |
| *G06K 9/46* | (2006.01) | |

(52) U.S. Cl.
CPC .......... *G01S 15/931* (2013.01); *G01S 17/023* (2013.01); *G01S 17/936* (2013.01); *G01S 2013/935* (2013.01); *G01S 2013/9314* (2013.01); *G01S 2013/9342* (2013.01); *G01S 2013/9346* (2013.01); *G01S 2015/932* (2013.01); *G06K 9/00791* (2013.01); *G06K 9/00798* (2013.01); *G06K 9/4604* (2013.01)

(58) Field of Classification Search
CPC ........ B60R 2300/105; B60R 2300/108; B60R 2300/301; B60R 2011/004; B60R 2001/1253; B60R 2001/1215; B60R 2300/804; B60R 1/02; B60R 2300/60; G01S 13/867; G01S 13/931; G01S 15/931; G01S 17/936; G01S 2013/9314; G01S 2013/9342; G01S 2013/9346; G01S 2013/935; G01S 2015/932; G01S 13/862; G01S 13/865; G01S 11/12; G01S 13/91; G01S 13/93; G01S 17/89; G01S 19/48; G01S 13/86; G01S 13/88; G01S 13/885; G01S 2013/9389; B60Q 1/2665; G06T 2207/30256; G06T 2207/30261; G06T 2207/30252; G06T 2207/30264; B60W 30/12; B60W 2420/52; B60W 2710/20; B60W 30/09; B60W 30/06; B60W 2550/10; B60W 50/14; B60W 2420/42; B60W 40/06; B62D 15/028; B62D 15/0285; G01C 21/00; G08G 1/167; G06K 9/00798; G06K 9/00805; G06K 9/4604; G06K 9/00; G06K 9/00791; G06K 9/6288
See application file for complete search history.

(56) References Cited

U.S. PATENT DOCUMENTS

| | | | | |
|---|---|---|---|---|
| 2007/0075892 | A1* | 4/2007 | Horibe | G01S 17/023 342/70 |
| 2007/0104352 | A1* | 5/2007 | Yoshiguchi | B60W 50/14 382/104 |
| 2010/0053320 | A1* | 3/2010 | Chen | G06K 9/52 348/135 |
| 2010/0292895 | A1* | 11/2010 | Nakamura | G08G 1/09623 701/41 |
| 2011/0044507 | A1* | 2/2011 | Strauss | B60R 21/0134 382/103 |
| 2012/0169526 | A1* | 7/2012 | Reilhac | B60W 50/0098 342/70 |
| 2014/0104424 | A1* | 4/2014 | Zhang | B60R 1/00 348/148 |
| 2014/0114536 | A1* | 4/2014 | Kobana | B60K 28/06 701/49 |
| 2014/0118182 | A1* | 5/2014 | Oh | G01S 13/867 342/52 |

FOREIGN PATENT DOCUMENTS

| | | |
|---|---|---|
| DE | 10 2009 000401 A1 | 7/2010 |
| DE | 11 2010 005 572 T5 | 2/2013 |
| EP | 0 305 907 B1 | 3/1992 |
| JP | 2004-98792 A | 4/2004 |
| JP | 2009-202724 A | 9/2009 |
| WO | 2011/058822 A1 | 5/2011 |

OTHER PUBLICATIONS

Written Opinion of the International Searching Authority issued in PCT/EP2014/075237 dated Feb. 25, 2015 (9 pages).
German Search Report issued in DE 10 2013 021 326.6, dated Aug. 21, 2014 (7 pages).
Notification of Reasons for Refusal issued in corresponding Japanese Patent Application No. 2016-540584, dated Jun. 13, 2017 (5 pages).

* cited by examiner

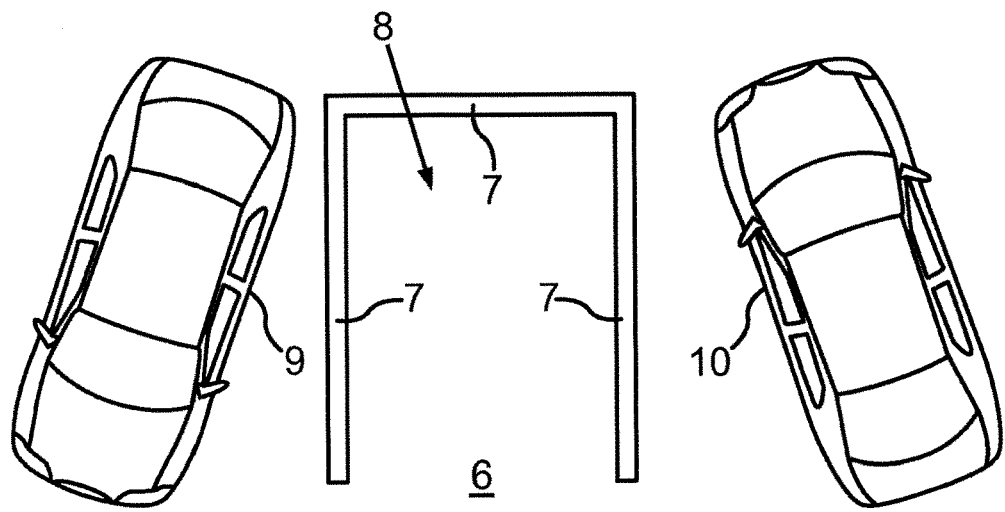
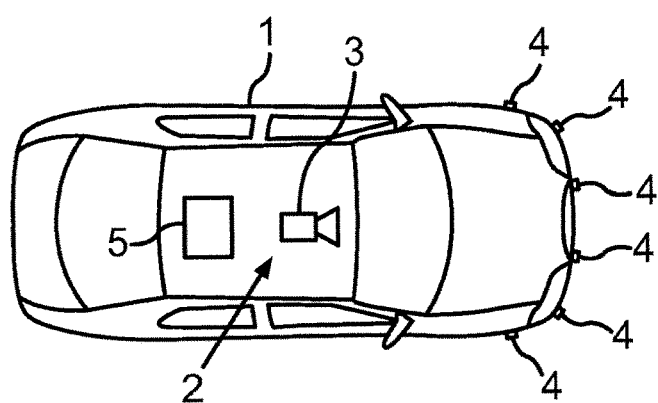
Fig.1
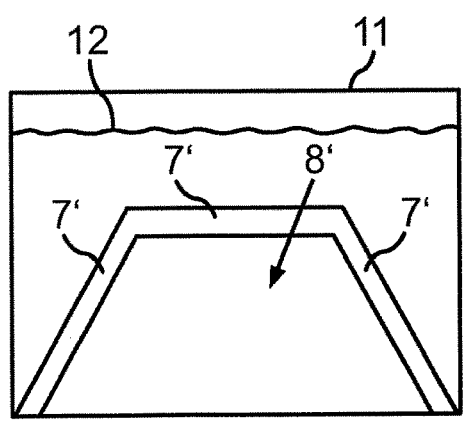
Fig.2

METHOD FOR DETECTING A MARK MADE ON A GROUND, DRIVER ASSISTANCE DEVICE AND MOTOR VEHICLE

The invention relates to a method for using a driver assistance device of a motor vehicle to detect a marking made on a ground. The invention furthermore relates to a driver assistance device that is designed to perform such a method, and to a motor vehicle having such a driver assistance device.

The concern in the present case is directed particularly towards parking assistance systems that are designed to perform parking manoeuvres for a motor vehicle. In this regard, a distinction is drawn between what are known as semiautonomous (semiautomatic) systems, on the one hand, and fully automatic systems, on the other. A common feature of all systems in this case is that a potential parking space is detected and a size of the parking space is recorded and then compared with a stored minimum size. If the recorded size of the detected parking space is at least equal to the minimum size, then the possibility of the parking manoeuvre is signalled to the driver. The system then ascertains the current relative position of the motor vehicle with respect to the parking space and computes a parking path (parking trajectory) along which the motor vehicle can be parked in the parking space without collision. In the case of semiautonomous parking assistance systems, the driver is assigned the tasks of accelerating and braking. In the case of semiautonomous parking assistance systems, longitudinal guidance of the motor vehicle is thus controlled by the driver himself, while transverse guidance is controlled by the parking assistance system itself by virtue of appropriate control signals being output to a steering apparatus of the motor vehicle. In the case of fully automatic parking assistance systems, on the other hand, both longitudinal guidance and transverse guidance are performed automatically by the parking assistance system by virtue of appropriate control signals being output both to the steering apparatus and to a drive train and a brake system of the motor vehicle. In the case of fully automatic systems, the driver merely needs to approve the parking manoeuvre and can also interrupt it at any time.

For the purpose of recording parking spaces, ultrasonic sensors are usually used that are fitted to the respective lateral edges in the front region of the motor vehicle. As the motor vehicle travels past a potential parking space, the ultrasonic sensor continuously measures the lateral distance of the motor vehicle from obstacles or objects that are external to the vehicle. On the basis of the profile of the measured values from the ultrasonic sensor and taking account of the distance covered, it is then possible to determine the size of the parking space in the longitudinal direction of the motor vehicle or in the longitudinal direction of the road and also the relative position of the parking space with respect to the motor vehicle. This applies both to parallel parking spaces, the longitudinal axis of which is oriented essentially parallel to the road, and to transverse parking spaces, the longitudinal axis of which runs perpendicular or at an acute angle with respect to the road. Such a detection method is known from the document EP 0 305 907 B1, for example.

It is furthermore already prior art to detect parking spaces by using both the sensor data from ultrasonic sensors and image data from a camera and combining them with one another. Such sensor fusion is known from the document DE 10 2007 047 362 A1, for example.

A method for providing an image presentation on a display using image data from a camera and sensor data from multiple ultrasonic sensors is known from the document DE 11 2010 005 572 T5.

In parking assistance systems today, which are designed to detect parking spaces on the basis of image data from a camera and on the basis of sensor data from an ultrasonic sensor, a parking space is usually detected by means of an ultrasonic sensor first of all. When a parking space is detected on the basis of sensor data from the ultrasonic sensor, the image data are additionally evaluated and the originally detected parking space is corrected if need be. Such correction is necessary, for example, when a vehicle bounding the parking space is parked obliquely, i.e. at an acute angle with respect to the longitudinal direction of the parking space. In order to be able to prevent the ego motor vehicle from also being parked obliquely in the detected parking space by the parking assistance system in such cases, recognition of the parking space markings by means of a camera is necessary. Furthermore, image data can also be used to detect parking spaces that have no vehicles parked next to them and that are therefore bounded exclusively by appropriate parking space markings on the ground. Line recognition works particularly reliably particularly when the parking space is bounded by T-shaped markings.

Simple parking space markings that do not have the T shape can be detected only inadequately, on the other hand. Such markings can easily be confused with shadows or with trims on other vehicles.

It is an object of the invention to demonstrate a solution to how a method of the type cited at the outset allows the driver assistance device to be used to detect markings made on a ground particularly reliably.

The invention achieves this object by means of a method, by means of a driver assistance device and by means of a motor vehicle having the features according to the respective independent patent claims. Advantageous embodiments of the invention are the subject matter of the dependent patent claims, the description and the figures.

A method according to the invention allows a driver assistance device of a motor vehicle that is on a ground, for example on a road, to be used to detect a marking made on the ground. An imaging sensor of the driver assistance device is used to provide a two-dimensional image of vehicle surroundings, and a potential marking is identified on the basis of the two-dimensional image. A distance measurement is performed by means of a distance sensor of the driver assistance device, which distance is separate from the imaging sensor. A result of the distance measurement is then taken as a basis for determining whether the potential marking detected on the basis of the image is the marking made on the ground or else a marking on an object that is on the ground.

According to the invention, the potential marking identified on the basis of the two-dimensional image is accordingly plausibilized on the basis of sensor data that are provided by a distance sensor that can also detect three-dimensional objects. Since the two-dimensional image contains no depth information and the potential marking is detected by means of a ground projection of the image, solely the use of the two-dimensional image does not allow it to be established whether the potential marking is actually a marking made on the ground or else a marking situated above the ground on a three-dimensional object, for example a trim of elongate design on a vehicle or the like. If the distance measurement is performed by means of the distance sensor, then it is possible for the potential marking to be plausibilized, and it is possible to reliably establish whether the potential marking is actually a marking made on the ground or a marking on the object. The detection of ground markings can therefore take place particularly reliably.

The marking detected in the case of the method is preferably a longitudinal marking, i.e. an elongate, linear marking. By way of example, a marking may be a parking space marking that bounds a parking space. Additionally or alternatively, the marking may also be a longitudinal road marking that defines a lane on a road.

Preferably, the driver assistance device determines a position of the potential marking relative to the motor vehicle on the basis of the two-dimensional image, and plausibilizes the potential marking by comparing said position with the result of the distance measurement. The relative position of the potential marking is preferably determined by means of a ground projection of the potential marking onto the ground, specifically along a straight line connecting the imaging sensor to the potential marking. Since the two-dimensional image contains no depth information, the relative position of the potential marking can be determined only by projecting this marking onto a plane of the ground. If this relative position of the potential marking is known, then it can be compared with the result of the distance measurement and hence plausibilized. This makes it possible to rule out errors in the detection of markings.

In this connection, there may be the particular provision that if the distance measurement involves a distance being measured that is shorter than a distance of the potential marking from the motor vehicle, then the potential marking is interpreted as the marking on the object and hence not a genuine ground marking. Since, in order to be able to take the two-dimensional image as a basis for determining the position of the potential marking, the marking is projected onto the ground plane, this marking is possibly at a greater distance from the motor vehicle than the distance measured by the distance sensor. Since it is not plausible for an actual ground marking to be able to be detected behind a three-dimensional object, this must be a misdetection. If an object is thus detected in front of the potential marking, this potential marking is interpreted as a line above the ground and can therefore be rejected.

If, on the other hand, the distance measurement involves no object being detected or a distance being measured that is longer than a distance of the potential marking from the motor vehicle, then the potential marking is preferably interpreted as the marking made on the ground and hence a genuine marking. In this case, detection of the ground marking is confirmed, as a result of which it can be interpreted as a parking space marking or else a longitudinal road marking, for example. The detection is therefore plausible.

In respect of the recording of the two-dimensional image, a wide variety of embodiments may be provided: first, the provision of two-dimensional image data can involve the use of a camera, particularly a colour-sensitive camera, such as a CMOS camera or a CCD camera, for example. Such a camera is an image recording device that can detect light in the visible spectral range and hence can provide images of the vehicle surroundings. Although image data from a camera can be taken as a basis for detecting markings made on the ground, the image data in a single frame contain no depth information. For this reason, the position of a detected marking can be ascertained only by means of the projection onto the ground plane. Specifically when using such a camera, the plausibilization according to the invention by means of a distance sensor is found to be particularly advantageous.

Additionally or alternatively, the imaging sensor used can also be a laser scanner.

The distance measurement is preferably effected using an ultrasonic sensor. Additionally or alternatively, the distance sensor used can also be a laser scanner and/or a radar sensor and/or a camera providing three-dimensional image data. Such a camera may be a stereo camera and/or a camera in which three dimensional image information is provided on the basis of multiple images that are recorded during the journey of the motor vehicle, for example. In this case, the SLAM (simultaneous localization and mapping) method can be used, for example.

As already explained, the driver assistance device may be in the form of a parking assistance system by means of which parking spaces are detected and the motor vehicle is parked at least semiautonomously. As a marking, the parking assistance system can then detect a parking space marking that bounds a parking space. On the basis of the detected parking space marking, the system can then detect a parking space and/or stipulate a target position for the motor vehicle in a parking space. Hence, at least semiautonomous parking manoeuvres can be performed particularly reliably, since the precise orientation of the parking space can be ascertained on the basis of the detected parking space marking.

Additionally or alternatively, the driver assistance device may also be designed to recognize a lane on a road. The marking detected is then a longitudinal road marking. In this embodiment, the driver assistance device may be in the form of a lane departure warning system, for example.

The invention furthermore relates to a driver assistance device for a motor vehicle that is designed to detect a marking made on a ground and comprises an imaging sensor for providing a two-dimensional image, an evaluation device for identifying a potential marking on the basis of the two-dimensional image and a distance sensor for performing a distance measurement. The evaluation device is designed to take a result of the distance measurement as a basis for determining whether the potential marking is the marking made on the ground or a marking on an object that is on the ground.

A motor vehicle according to the invention, particularly a car, comprises a driver assistance device according to the invention.

The preferred embodiments presented with reference to the method according to the invention, and the advantages of said embodiments, apply accordingly to the driver assistance device according to the invention and to the motor vehicle according to the invention.

Further features of the invention will emerge from the claims, the figures and the description of the figures. All features and combinations of features cited in the description above and the features and combinations of features that are cited in the description of the figures below and/or in the figures alone can be used not only in the respectively indicated combination but also in other combinations or else on their own.

The invention will now be explained in more detail on the basis of a preferred exemplary embodiment and with reference to the appended drawings, in which:

FIG. 1 shows a schematic illustration of a motor vehicle with a driver assistance device according to an embodiment of the invention, said motor vehicle being situated next to a parking space;

FIG. 2 shows an exemplary image of the parking space;

Figure 3:
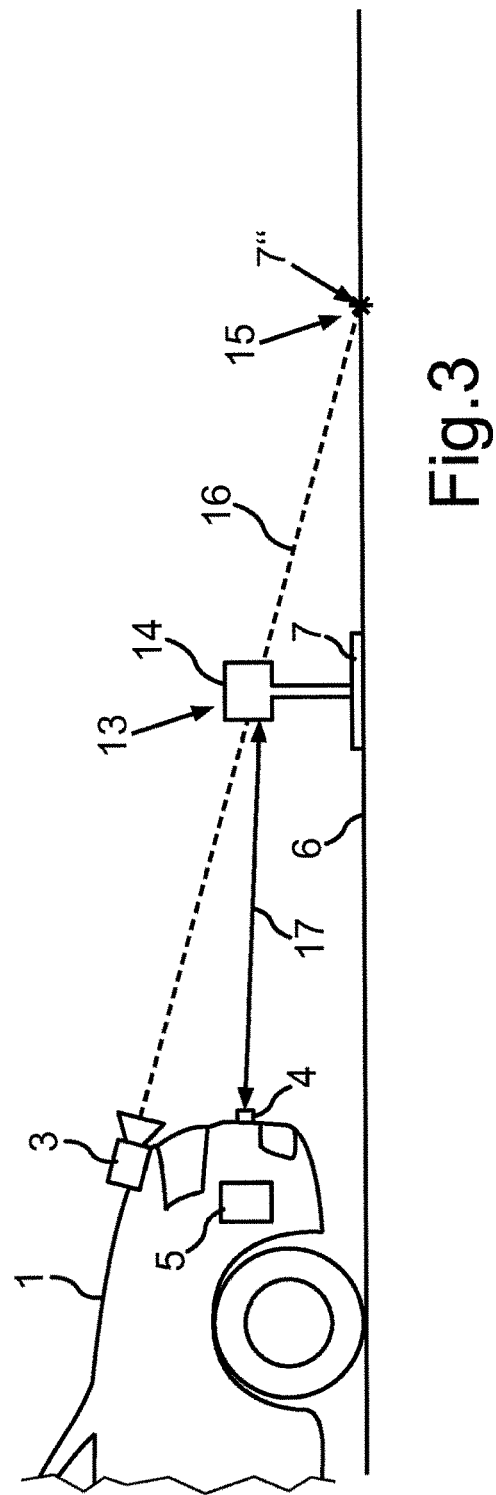
FIG. 3 shows a schematic illustration of a region of the motor vehicle, wherein a method according to an embodiment of the invention is explained in more detail.

A motor vehicle 1 as shown in FIG. 1 is a car having a driver assistance device 2 according to an embodiment of the invention, for example. In the exemplary embodiment, the driver assistance device 2 is in the form of a parking assistance system that is designed to detect parking spaces and to perform semiautomatic or fully automatic parking manoeuvres. The parking assistance system can automatically compute a suitable parking path along which the motor vehicle 1 can then be guided automatically or semiautonomously into a previously detected parking space. In the case of fully automatic parking assistance systems, the driver assistance device 2 undertakes both longitudinal guidance and transverse guidance for the motor vehicle 1, whereas in the case of semiautomatic or semiautonomous systems, the driver assistance device 2 controls only the transverse guidance and hence the steering automatically, while the driver needs to accelerate and brake himself.

The driver assistance device 2 may additionally or alternatively also be in the form of a lane departure warning system.

The driver assistance device 2 comprises an imaging sensor 3 that is in the form of a camera in the exemplary embodiment. The driver assistance device 2 also includes a multiplicity of distance sensors 4, which are ultrasonic sensors, for example. The distance sensors 4 may be in a distributed arrangement on the front bumper of the motor vehicle 1, for example. Corresponding distance sensors 4 may also be arranged on the rear bumper. At least one distance sensor 4 is arranged on the respective lateral face of the motor vehicle 1.

The driver assistance device 2 furthermore comprises an electronic evaluation device 5 that is designed to detect markings 7 made on a ground 6—in this case a road. When the markings 7 are detected, the detected markings 7 can be taken as a basis for detecting a parking space 8 and/or stipulating a target position for the motor vehicle 1 within the parking space 8. Detection of the markings 7 allows determination of the orientation of the parking space 8 in situations in which the parking space 8 is laterally bounded by obliquely parked vehicles 9, 10. Using the distance sensors 4 only, precise recording of the parking space orientation is not possible, or possible only to a limited degree, in such cases.

The markings 7 are detected using image data from the imaging sensor 3. An exemplary image 11 of the parking space 8' or of the markings 7' is shown schematically in FIG. 2, where 12 denotes a horizon. In this case, the image 11 corresponds to an image of the vehicle surroundings that is provided by the camera. In order to detect the markings 7', what is known as a gradient image or edge image can be produced from the image from the camera and is then taken as a basis for identifying the markings 7'.

Figure 4:
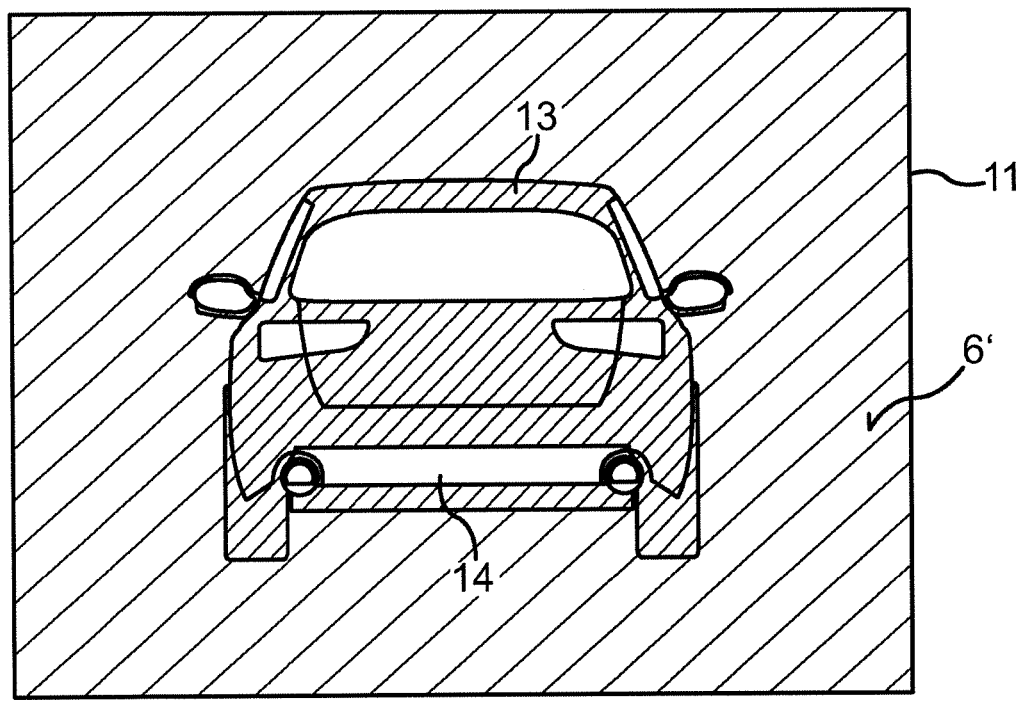
FIG. 4 shows a schematic illustration of an image to explain the method.

If no further object is situated between the motor vehicle 1 and the markings 7, then the markings 7 can be detected without any problem, in principle, on the basis of image data from the sensor 3. Difficulties can arise in the prior art when—as shown in FIG. 3—there is an object 13 on the ground 6, for example in the region of an actual marking 7. If the object 13 is a dark vehicle with a light, elongate chrome strip 14, for example, then the sensor 3 provides an image 11 as shown schematically in FIG. 4. This depicts an object 13 in the form of a black vehicle with an elongate chrome strip 14, the object 13 standing on a dark ground 6'. Without additional plausibilization, the evaluation device 5 would interpret the chrome strip 14 as a ground marking.

In order to prevent such erroneous interpretations, the evaluation device 5 performs additional plausibilization for the potential markings detected on the basis of the image 11. Referring again to FIG. 3, the imaging sensor 3 provides an image that depicts the object 13—for example with a cited chrome strip 14 or another elongate marking. This chrome strip 14 is interpreted by the evaluation device 5 as a potential marking 7" that is in a relative position with respect to the motor vehicle 1 that is obtained by means of a ground projection 15 along a straight line 16 connecting the sensor 3 to the chrome strip 14. The reason is that the imaging sensor 3 can only provide a two-dimensional image 11 of the surroundings that contains no depth information. In order to plausiblize or confirm this potential marking 7", a distance measurement is now performed using the distance sensor 4, which measures a distance 17 from the object 13. The evaluation device 5 then checks whether the measured distance 17 is shorter or longer than a distance of the potential marking 7" from the motor vehicle 1. In other words, the evaluation device 5 checks whether or not there is an object 13 in front of the potential marking 7"—i.e. between the motor vehicle 1 and the potential marking 7". If the object 13 is detected in front of the potential marking 7", the potential marking 7" is interpreted by the evaluation device 5 as the chrome strip 14 and hence as a marking on the object 13. If no object 13 is detected in the region between the motor vehicle 1 and the potential marking 7", on the other hand, then the potential marking 7" is interpreted as a marking 7 that is actually made on the ground 6 and whose position corresponds to the position of the potential marking 7" in FIG. 3.

The invention claimed is:

1. A method for using a driver assistance device of a motor vehicle to detect a marking made on a ground the method comprising:
   providing a two-dimensional image by an imaging sensor of the driver assistance device;
   identifying a potential marking on the basis of the two-dimensional image;
   performing a distance measurement by a distance sensor of the driver assistance device; and
   taking a result of the distance measurement as a basis for determining whether the potential marking is the marking made on the ground or a marking on an object that is on the ground;
   wherein when the result of the distance measurement does not detect an object, the potential marking is interpreted as the marking made on the ground.

2. The method according to claim 1, wherein the driver assistance device determines a position of the potential marking relative to the motor vehicle on the basis of the two-dimensional image, particularly by a ground projection of the potential marking onto the ground, and plausibilizes the potential marking by comparing said position with the result of the distance measurement.

3. The method according to claim 2, wherein when the distance measurement involves a distance being measured that is shorter than a distance of the potential marking from the motor vehicle, then the potential marking is interpreted as the marking on the object.

4. The method according to claim 2, wherein when the distance measurement involves a distance being measured that is longer than a distance of the potential marking from the motor vehicle, then the potential marking is interpreted as the marking made on the ground.

5. The method according to claim 1, wherein the two-dimensional image is provided by a camera and/or by a laser scanner as an imaging sensor.

6. The method according to claim 1, wherein the distance measurement is performed by an ultrasonic sensor and/or by a laser scanner and/or by a radar sensor and/or by a camera providing three-dimensional image data as a distance sensor.

7. The method according to claim 1, wherein a parking space is detected and/or a target position for the motor vehicle in a parking space is stipulated by using the driver assistance device to detect a parking space marking as the marking made on the ground.

8. The method according to claim 1, wherein a lane is recognized by using the driver assistance device to detect a longitudinal road marking as the marking made on the ground.

9. A driver assistance device for a motor vehicle, for detecting a marking made on a ground, having:

an imaging sensor for providing a two-dimensional image;

an evaluation device for identifying a potential marking on the basis of the two-dimensional image; and a distance sensor for performing a distance measurement, wherein the evaluation device is designed to take a result of the distance measurement as a basis for determining whether the potential marking is the marking made on the ground or a marking on an object that is on the ground;

wherein when the result of the distance measurement does not detect an object, the potential marking is interpreted as the marking made on the ground.

10. A motor vehicle having a driver assistance device according to claim 9.

* * * * *